US012146647B2

(12) United States Patent
Lin

(10) Patent No.: US 12,146,647 B2
(45) Date of Patent: Nov. 19, 2024

(54) PICTURE FRAME WITH FRONT-SHINING LED LIGHTS

(71) Applicant: Sonicgrace, Inc., Chino, CA (US)

(72) Inventor: Dong Lin, Rancho Cucamonga, CA (US)

(73) Assignee: Sonicgrace, Inc., Chino, CA (US)

( * ) Notice: Subject to any disclaimer, the term of this patent is extended or adjusted under 35 U.S.C. 154(b) by 97 days.

(21) Appl. No.: 18/302,686

(22) Filed: Apr. 18, 2023

(65) Prior Publication Data

US 2024/0353092 A1 Oct. 24, 2024

(51) Int. Cl.
*F21V 33/00* (2006.01)

(52) U.S. Cl.
CPC ................................ *F21V 33/0032* (2013.01)

(58) Field of Classification Search
CPC ............ F21V 33/0032; F21V 23/0485; A47G 1/0622; F21Y 2105/16
See application file for complete search history.

(56) References Cited

U.S. PATENT DOCUMENTS

2004/0049962 A1* 3/2004 Moshirnoroozi .... A47G 1/0622 40/768
2010/0088941 A1* 4/2010 Zhu ..................... A47G 1/0622 40/714

* cited by examiner

*Primary Examiner* — Anne M Hines
(74) *Attorney, Agent, or Firm* — Jen-Feng Lee, Esq.

(57) ABSTRACT

Present invention teaches the construction of a picture frame where a plurality of LED light modules is placed between a backing layer and a guiding layer, allowing the generated light pattern to shine towards the front direction, in a controlled fashion; the connection of LED light modules is made either by a guard strip or by an optional guard film, to better accommodation to the size/volume of the LED light modules. The guiding layer allows texts or graphic designs, or any artwork, to be inscribed/printed on to the surface as may be desired by actual product manufacturers when a digital photo, or video clip, is shown on the display screen.

17 Claims, 10 Drawing Sheets

Fig. 5
LOVE YOU TO THE
MOON AND BACK

PICTURE FRAME WITH FRONT-SHINING LED LIGHTS

BACKGROUND OF THE INVENTION

Present invention disclosed a picture frame where a plurality of LED lights, placed along the peripheral section of the display screen of the picture frame, can be controlled to turn on and to display light patterns, with optional desired graphics or textual content, towards the front, to the viewers.

The new feature exhibited in the present invention is completely different from existing picture frames already on the market where some LED lights are present and project lights sideways from the side of the outside frame. Such existing picture frames cause the LED lights to go out in an uncontrolled manner, towards all outward direction.

On the contrary, the present invention's LED lights are directed and controlled to shine towards the front, that is, to shine towards the viewers. And because of such direction control, additional consumer desirable features can be added, such as corporate logo, or other artwork of textual or graphic content that may be added to enhance the product value and to satisfy consumer demands.

SUMMARY OF THE INVENTION

The invention relates to a picture frame that can display digital images (still pictures or videos) with additional decorative and informative graphics as may be desired by individual users or merchants. Certainly, not just still pictures, video clips can also be displayed, along with sound effects that are part of the video clips.

The picture frame of present invention is composed primarily of a front frame, a guiding layer, a guard strip, a plurality of LED light modules, a backing layer, and a display screen, forming the major components.

In addition to the major components, additional elements include a LED control unit, Main PCB, speaker, switch, back panel and an external bracket.

Depending on embodiment, an alternative configuration consists of a front frame, a guiding layer, a guard film, a plurality of LED light modules, a backing layer and a display screen to form the major components.

The main difference between the first embodiment and the alternative embodiment is that in the first embodiment, the LED lights modules are fitted to the side of the guiding layer and is enclosed in by the guard strip. This configuration can also be conceptually described as combining the LED light modules and the guard strip into a single component as shown herein. The side of the guiding layer can be made to have zig-zag shape to better fit the size/volume of the LED light modules.

In the alternative embodiment, the LED light modules are placed on one side of the backing layer; the one side will be the side facing the front of the picture frame. The guiding layer then is attached to the front side of the backing layer, sandwiching the LED light modules in between the guiding layer and the backing layer. A guard film can be optionally added to facilitate connection/installation to the guiding layer, specifically to the rear side of the guiding layer, better fitting the size/volume of the LED light modules.

The guiding layer serves to transmit the lights generated by the LED light modules, for better diffusing and spreading lights evenly throughout the overall surface of the guiding layer. The guiding layer is made from either transparent material or translucent material, such as acrylic, that allows light to travel and shine through.

The main PCB unit has a built-in power supply unit; alternatively, the power supply unit can be an independent unit outside of the main PCB unit. The main PCB unit has some memory to hold images (pictures or videos); similarly, some independent memory unit can be implemented outside of the main PCB unit to receive and hold images to be displayed on the display screen. Such construction of power supply unit and memory unit require no disclosure for persons of ordinary skill in the art relevant to the present invention.

Due to the arrangement of the LED light modules and the configurations presented, the lights are controlled to shine towards the front, instead of towards the sides of the picture frame, or any other direction.

A speaker can be additionally installed within the flatly stacked assembly for generating sound if such sound/music content is also coded into digital images (still images or video clips) that would be displayed.

A receiver/indicator unit can be additionally added and works to receive control signals that can be remotely transmitted to the picture frame of present invention. The remote transmission can be done by a commercially available remote control device. This usage and connection of a commercial remote control mechanism is a known art and is not required to be displayed in present application.

In both the first embodiment and the alternative embodiment, the guiding layer allows texts, graphics or other designs to be inscribed/imprinted on it. Due to the transparent/translucent attribute, the LED light modules, when shining towards the front (the direction of the viewers), would show desired text content, or graphic content, or any imprinted artwork, having a backlit visual feature enabled by the specific placement of the LED light modules.

An external bracket serves to provide the standing or propping up mechanism for the picture frame. It alternatively serves to connect to other mechanical structure for standing or to install to other device/setup for convenient viewing.

A switch can be optionally added to provide a manual on/off operation.

BRIEF DESCRIPTION OF DRAWINGS

The accompanying drawings exemplify the preferred embodiments of the invention. Together with the description, serve to explain the principles of the invention.

A brief description of the drawings is as follows:

FIGS. 6*a*-1, 6*a*-2, and 6*b* show a sample circuitry design for the LED control unit: 6*a*-1 and 6*a*-2 includes circuitry for speaker and switch; 6*b* includes optional antenna/receiver circuitry.

DETAILED DESCRIPTION OF THE INVENTION

Figure 1:
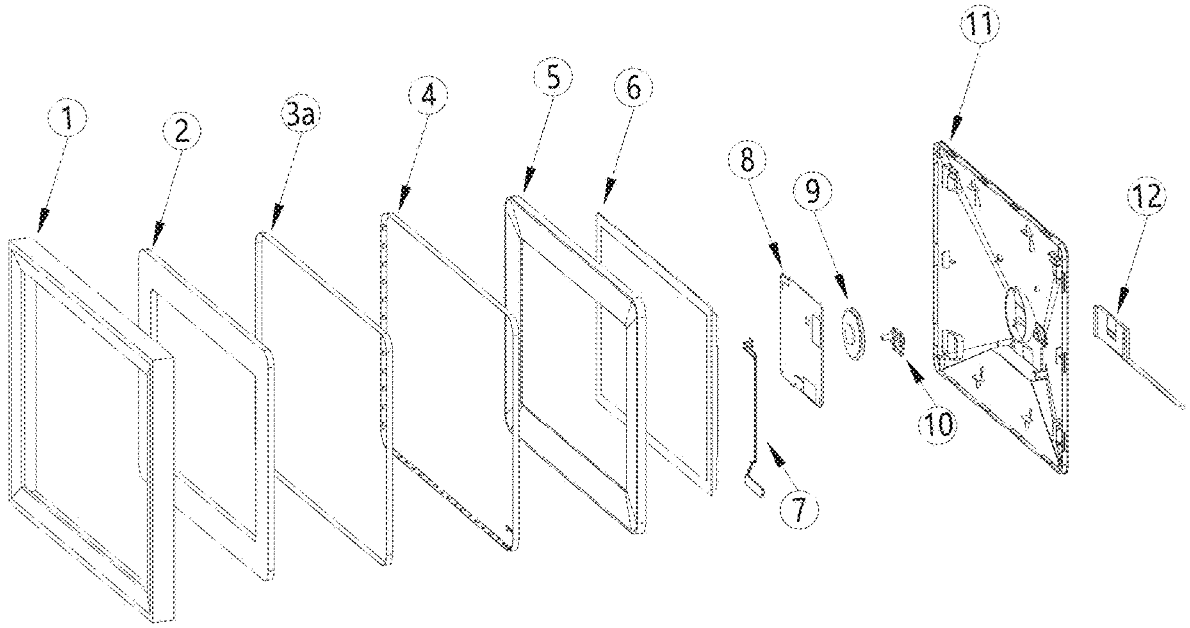
FIG. 1 shows the exploded view of the first embodiment of present invention.

The picture frame of present invention is primarily composed of a front frame 1, a guiding layer 2, a guard strip 3*a*, a plurality of LED light modules 4, a backing layer 5, and a display screen 6 that form the major components. Reference FIG. 1.

In addition to the major components, additional elements include a LED control unit 7, Main PCB unit 8, speaker 9, switch 10, back panel 11 and an external bracket 12.

The main PCB unit 8 represents the block functional unit of a printed circuit board that is similar to those on available digital picture frames, including those with LED lights shining sideways. As such, no additional disclosure is required herein.

Depending on embodiment, an alternative configuration consists of a front frame 1, a guiding layer 2, a guard film 3*b*, a plurality of LED light modules 4, a backing layer 5 and a display screen 6 to form the major components. Please see FIG. 2. The additional elements, mentioned hereinabove, of LED control unit 7, main PCB unit 8, speaker 9, switch 10, back panel 11 and external bracket 12 will remain unchanged, including the way they are fitted into the final assembly of the picture frame of present invention.

The LED light modules 4 are placed in a manner to go substantially along the inner perimeter of the backing layer 5

The guiding layer 2 is made to be substantially in the same shape as the backing layer 5. The guiding layer 2 is made from either transparent material or translucent material that allows light to travel and shine through. The guiding layer 2 can be made from acrylic, or other similar or suitable materials as long as it can serve to transmit substantial amount of lights generated from the LED light modules 4.

The display screen 6 receives and displays digital images transmitted from a main PCB unit 8; said PCB 8 unit includes a power unit that supplies electrical power to other parts within the picture frame. Alternatively, a separate power unit can be made to be independent from the main PCB 8. Said PCB unit 8 includes sufficient memory to hold the images (pictures or videos) for displaying on the display screen 6. Alternatively, separate memory unit can be implemented to exist outside of the PCB unit 8 to hold such images. No disclosure is need regarding the power unit or the memory as a person ordinarily skill in the art, relevant to the technology of the present invention, can practice such elements without further disclosure.

Figure 2:
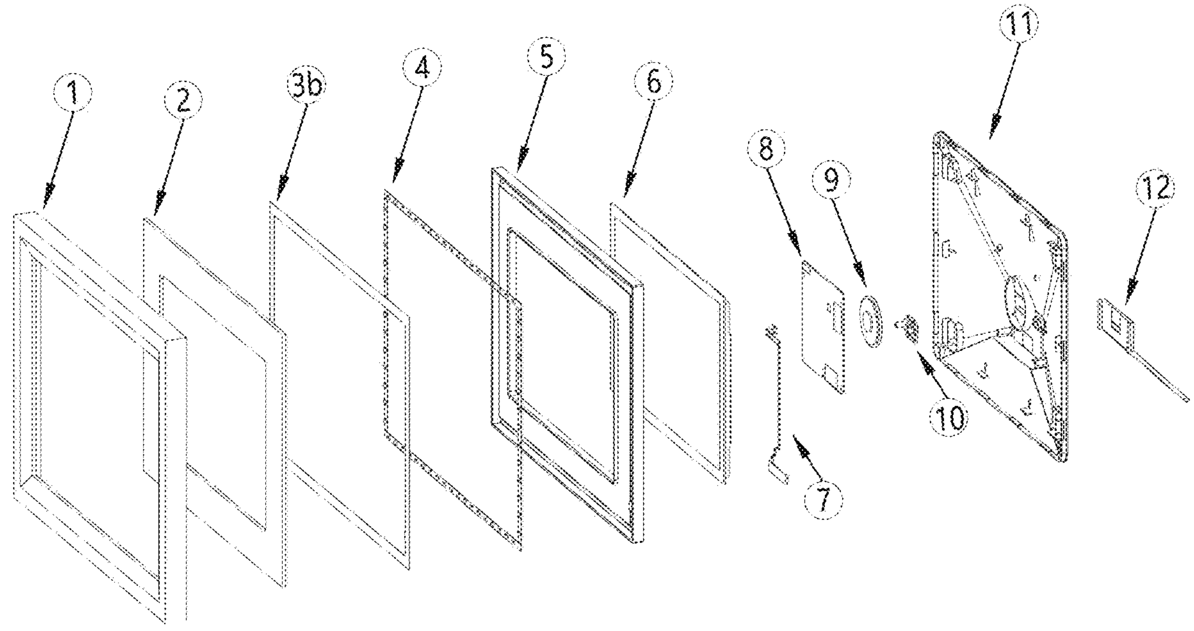
FIG. 2 shows the exploded view of the second embodiment of present invention.
Figure 3:
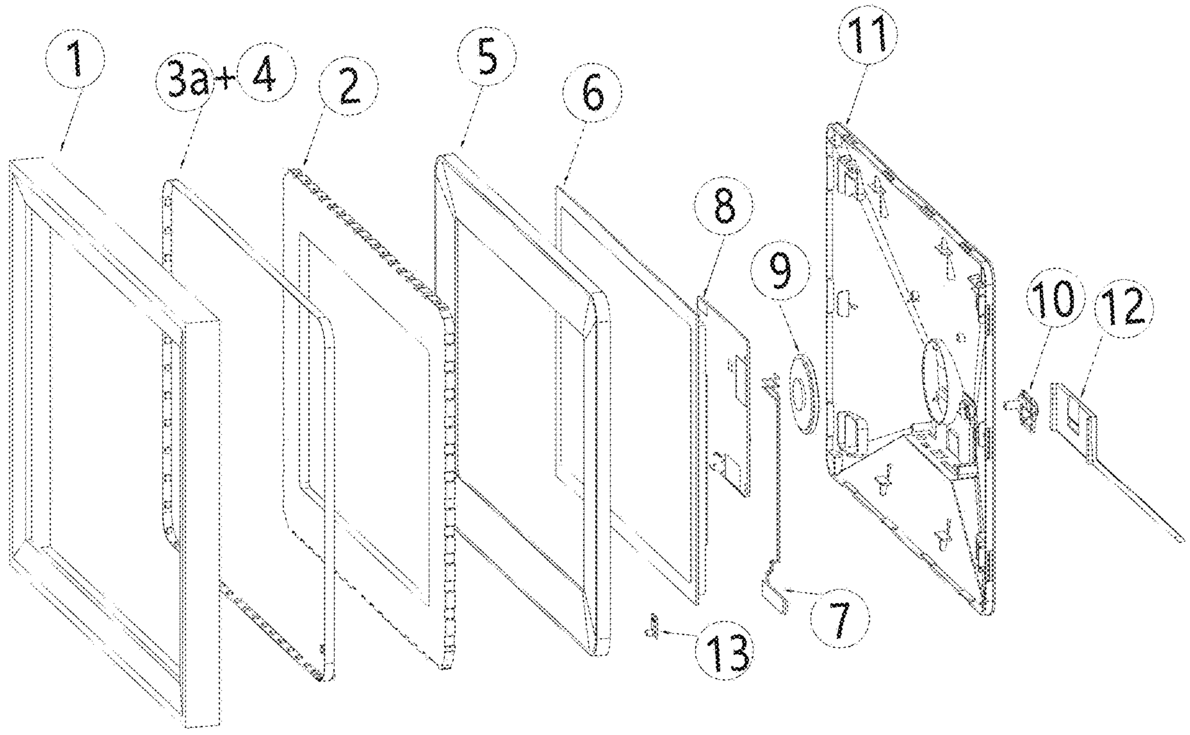
FIG. 3 shows the exploded view of the first embodiment of present invention where the guard strip and the LED light modules are conceptually combined as a single component.

A backing layer 5 will be placed along the outside perimeter of said display screen 6, as shown in FIGS. 1-3. The backing layer 5 serves to block the lights (generated from the LED light modules 4) from shining towards the back side of the picture frame and bleed into the display screen 6 area.

In a first embodiment, a plurality of LED light modules 4 are assembled to the inner side of a guard strip 3*a*, with that assembly then placed to surround the outside perimeter of said guiding layer 2. This shown in the exploded illustration of FIG. 1.

This configuration can also be conceptually described as combining the LED light modules 4 and the guard strip 3*a* into a single component as shown in FIG. 3, noted as "3*a*+4". The side of the guiding layer 2 can be made to have zig-zag shape to better fit the size/volume of the LED light modules 4.

The components within the front frame 1 and the back panel 11, inclusive, would be flatly assembled to shape like a traditional picture frame.

An optional indicator/signal receiver 13 is placed at a corner of said front frame 1, serving to show working status and to receive optional control signal from a user. See FIG. 3.

Digital images (photos or videos) can be displayed on the display screen 6 while the LED light modules 4 can generate lights, allowing the light patterns to travel through the guiding layer 2 and towards the front side of the picture frame. The lights are thus controlled to shine towards the front, and NOT towards the side, the back, or any other direction.

In the first embodiment, the lights emitted by the LED light modules 4 would be blocked by the guard strip 3*a* to prevent shining sideways; the backing layer 5 would block the light from travelling towards the back direction.

In the second embodiment, the lights emitted by the LED light modules are similarly blocked by the backing layer 5 from shing towards the back direction. Because of the overall assembly fashion of these parts sandwiched between front frame 1 and back panel 11, no lights would be allowed to shine side-ways, except for the directing towards the front.

A separate LED control unit 7 can be additionally placed within the flatly stacked assembly to provide LED light pattern control independently from the functionality implemented by the main PCB unit 8. The LED control unit 7 can provide controls for LED light modules of different colors (RGB, Red/Green/Blue, as well as addition colors) as desired.

A speaker 9 is additionally placed within the flatly stacked assembly, connected to said Main PCB unit 8 for generating sound if such sound/music content is also coded into digital images (still images or video clips) that would be displayed.

A switch 10 is provided to provide the system with on/off operation, for potential manual on/off operation.

FIGS. 6*a*-1, 6*a*-2, and 6*b* provide sample circuitry design for the LED control unit 7, including circuitry for connecting the speaker 9 and the switch 10, as well as optional antenna/receiver circuitry.

An external bracket 12 serves to provide the standing or propping up mechanism for the picture frame. Alternatively, the external bracket 12 serves to connect to other mechanical structure for standing or to install to other device/setup for convenient viewing.

A receiver/indicator unit 13 is connected to said main PCB unit 8 and works to receive control signals that can be remotely transmitted to the picture frame of present invention. The remote transmission can be done by a commercially available remote-control device. This usage and connection of a commercial remote-control mechanism is a known art and is not required to be displayed in present application.

A power supply unit, whether within the main PCB 8 or independently provided, provides electrical power for the display screen 6, the main PCB 8, the LED light modules 4, the LED control module 7 and the speaker 9.

In the second/alternative embodiment, a guard film 3*b* can be optionally placed on top of the plurality of the LED sight modules 4 for easier connection/installation to the guiding layer 2, to better accommodate the size/volume of the LED light modules 4 when putting together the guiding layer 2 and the backing layer 5 together into a flatly assembled unit with the LED light modules 4 sandwiched in.

In both original embodiment and the alternative embodiment, the guiding layer 2 allows texts, graphics or other designs to be inscribed/imprinted on it. Thanks to the transparent/translucent attribute, the LED lights 4, when shining towards the front (the viewers), would show desired text content, or graphic content, or any imprinted images, having a backlit visual feature made by the LED lights 4.

Figure 4:
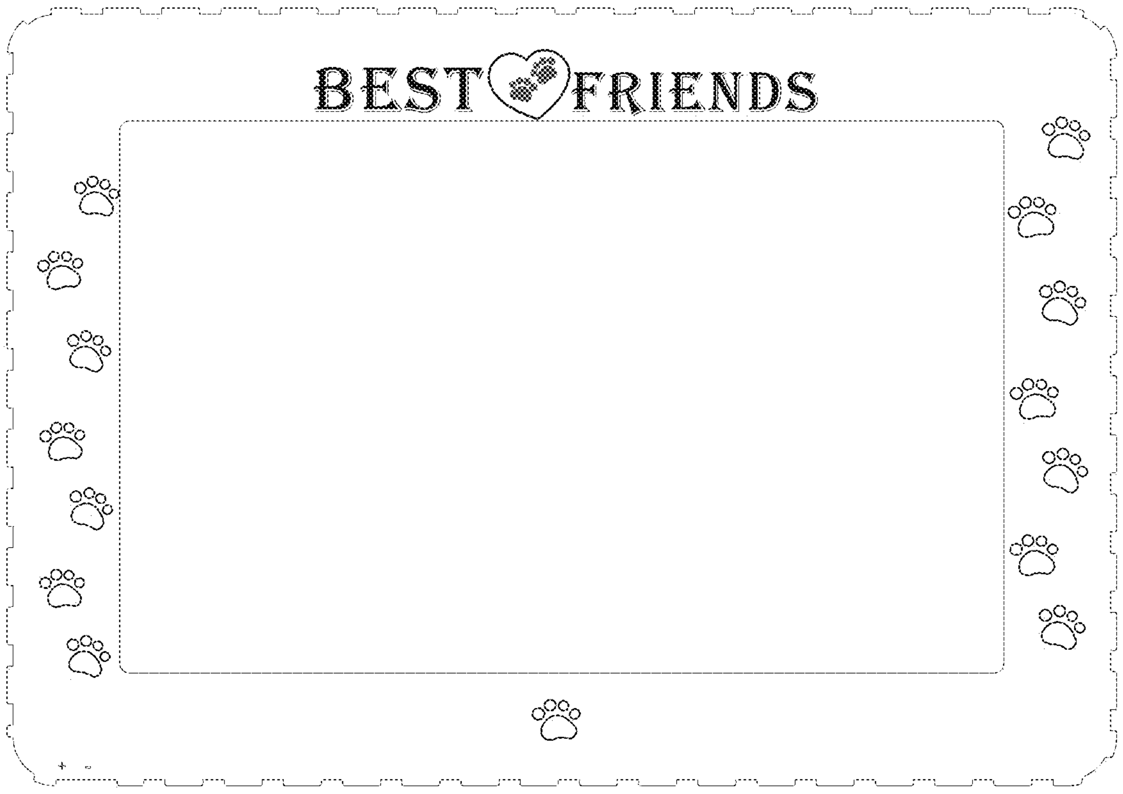
FIG. 4 shows the sample artwork for texts or graphics that can be inscribed or printed on to a side of the guiding layer, such that when the LED light modules are turned on, viewers/consumers can see such texts or graphics as desired/designed.
Figure 5:
FIG. 5 shows another sample artwork for texts or graphics inscription.
Figures 1, 6A:
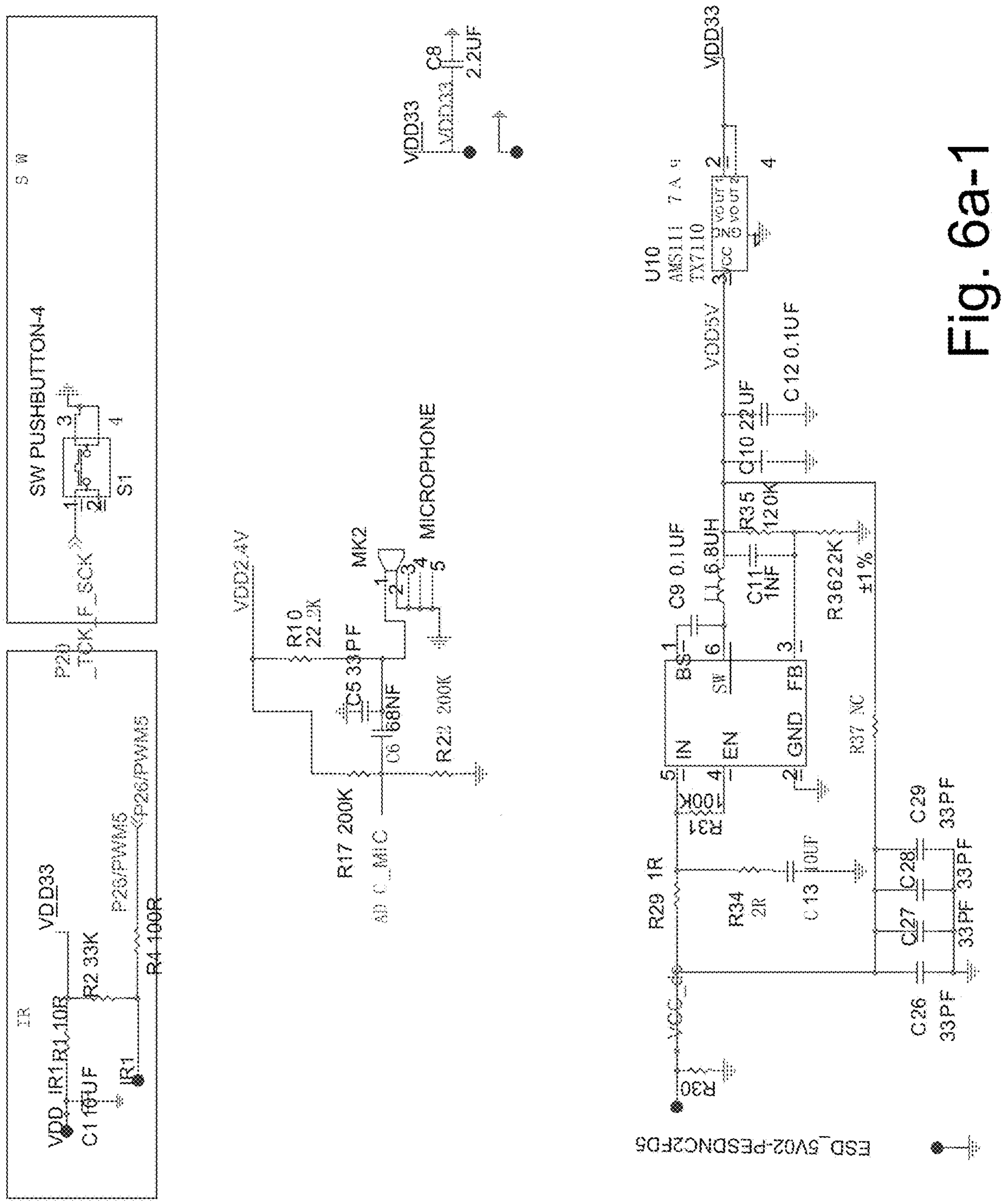
Figures 2, 6A:
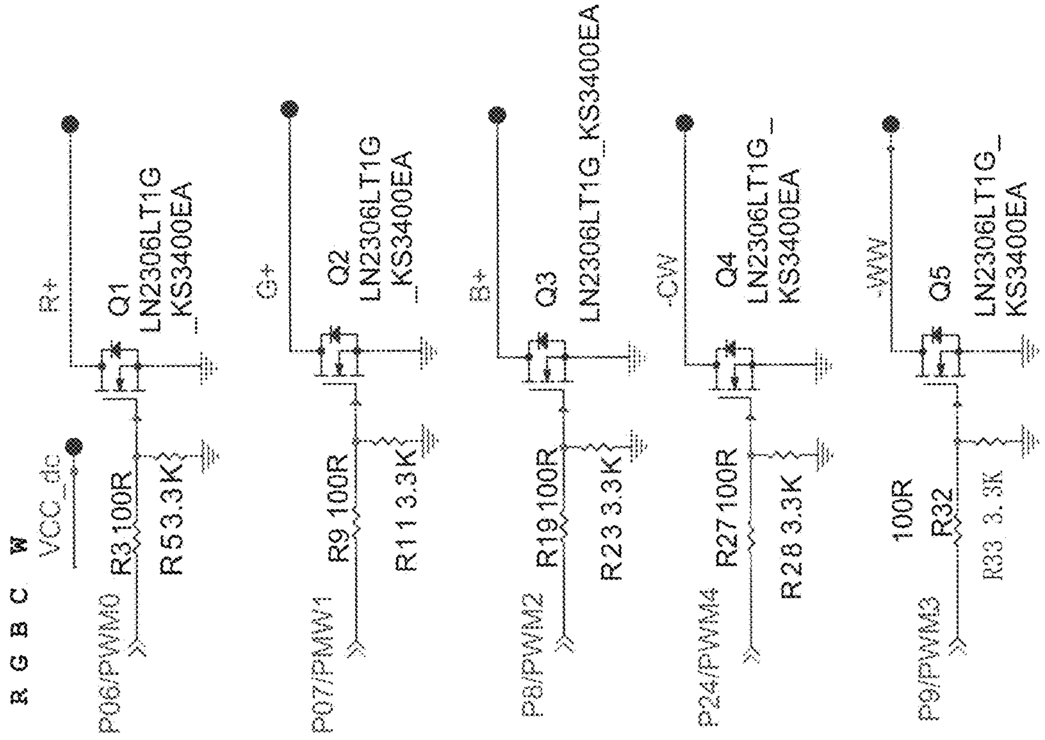
Figure 6B:
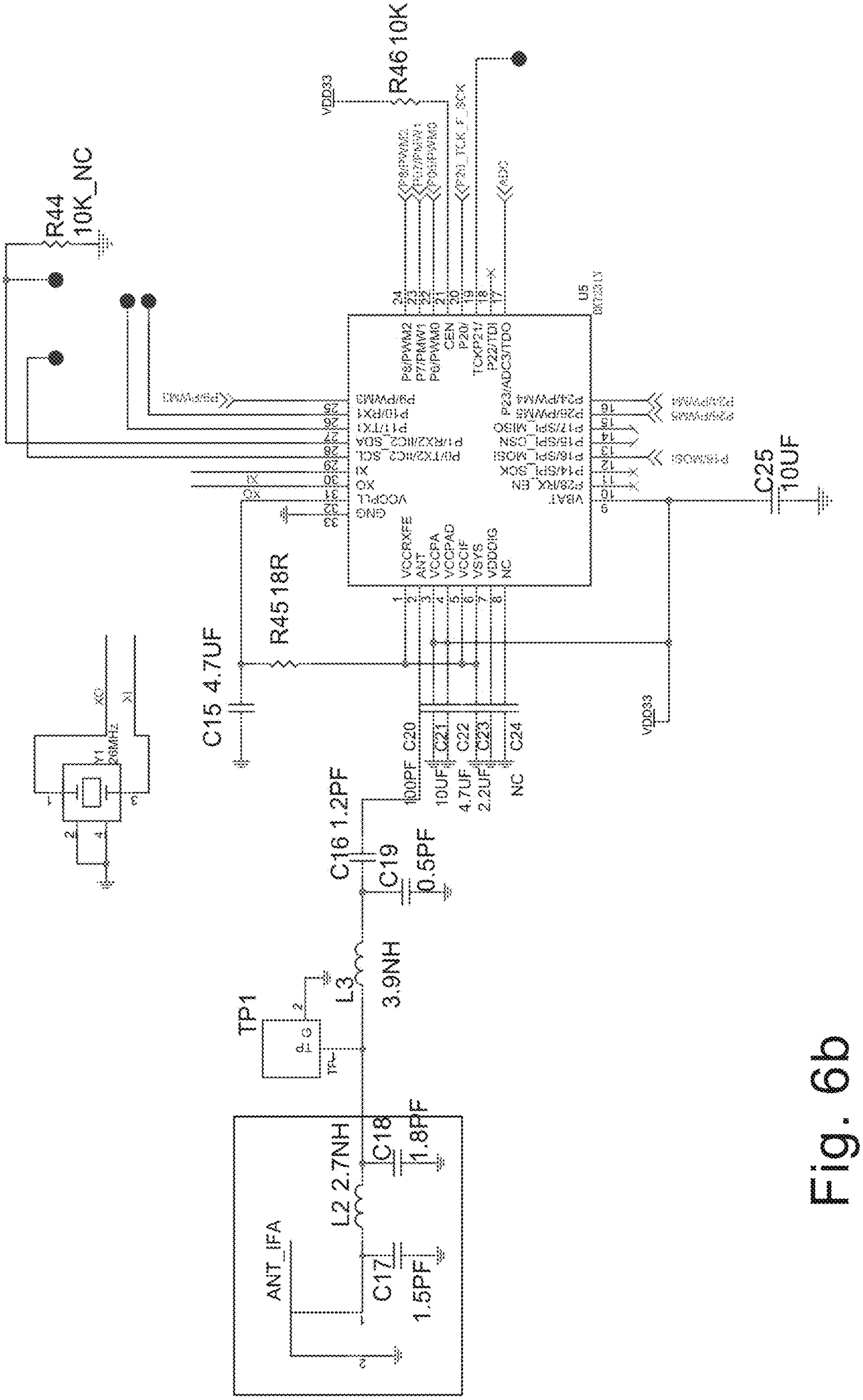

FIGS. 4 and 5 show sample artworks of texts or graphics that can be inscribed, printed, or otherwise placed on the surface of the guiding layer 2 to show desired messages/graphics to a viewer when looking at the picture frame.

Figure 7A:
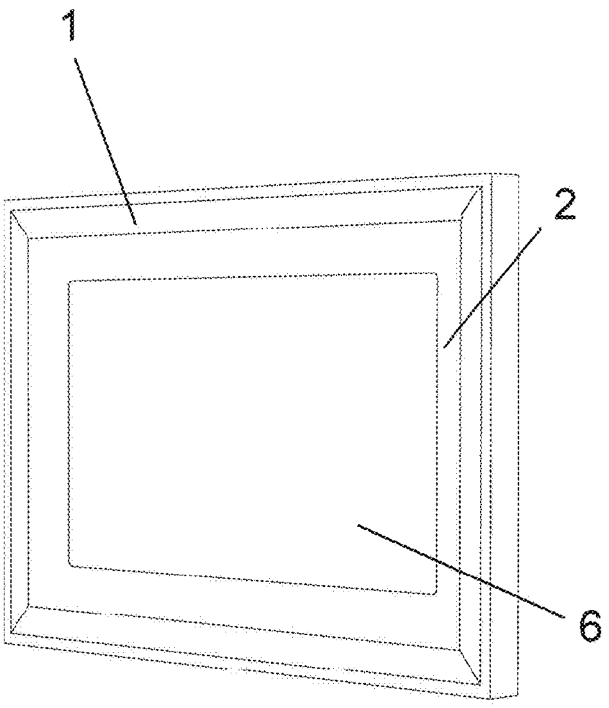
FIGS. 7*a* and 7*b* are the front perspective view and back perspective view of the picture frame of present invention, showing only the components viewable from the outside.
Figure 7B:
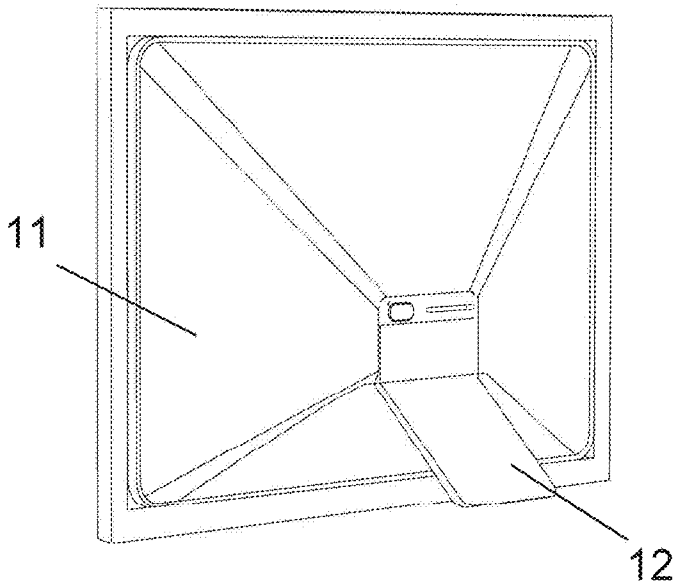

FIGS. 7*a* and 7*b* show the front and perspective views of a picture frame as envisioned in present application; only outside components are viewable.

Figure 8A:
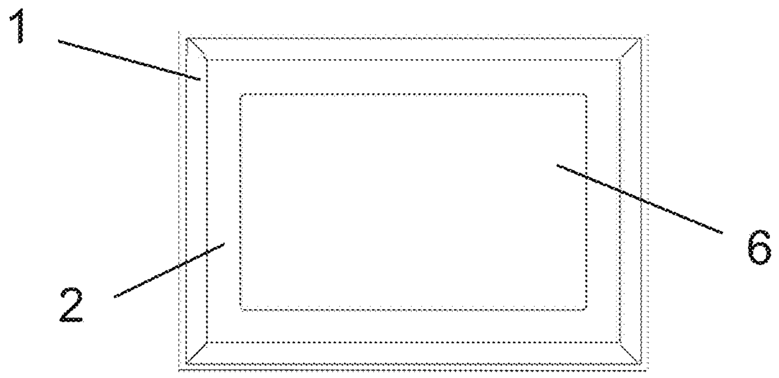
FIGS. 8*a*, 8*b*, and 8*c* are the front view, back view and side views of the picture frame of present invention, showing only the components viewable from the outside.
Figure 8B:
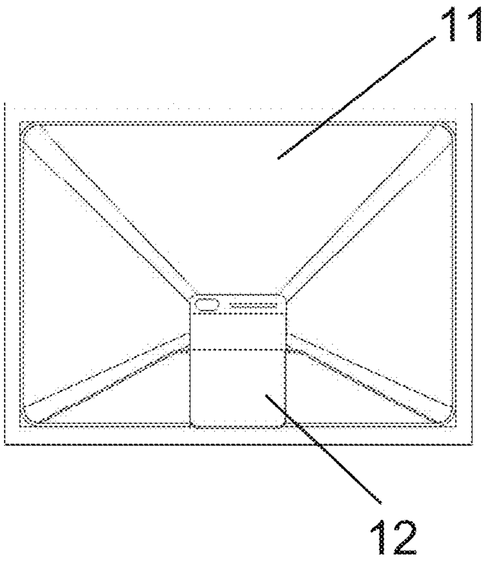
Figure 8C:
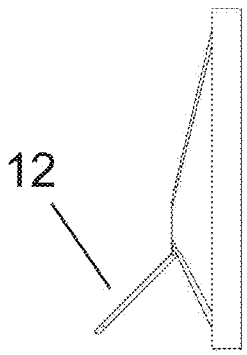

FIGS. 8*a*, 8*b*, and 8*c* show the front, back and side views of a picture frame as envisioned in present application.

It should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A picture frame, comprising:

a display screen for displaying digital images;

a backing layer placed along outside perimeter of said display screen;

a guiding layer substantially in the same shape as the backing layer;

a guard strip;

a plurality of LED light modules placed on inner side of said guard strip and is fitted to outside perimeter of said guiding layer;

a main PCB unit;

a front frame; and a back panel, wherein said front frame and back panel will sandwich in said display screen, said backing layer, said guiding layer, said guard strip and said LED lights in place in a flatly stacked manner whereby the LED light modules generate lights that emit through the guiding layer towards the front frame direction and not towards sideways or backward direction.

2. The picture frame of claim 1, wherein said guiding layer is made from suitable transparent or translucent material to allow the light traveling and shining through.

3. The picture frame of claim 1, further having a LED control unit connected to said main PCB unit to receive control signals transmitted to the picture frame.

4. The picture frame of claim 1, further having a speaker 9 connected to said main PCB unit to generate desired sounds or music.

5. The picture frame of claim 1, further having a power unit that supplies electrical power to said display screen, main PCB unit, said LED lighting modules, said LED control module, and said speaker.

6. The picture frame of claim 1, further having a switch on the outside surface of said back panel, providing a manual on/off control of the picture frame's operation.

7. The picture frame of claim 1, wherein a bracket is additionally added to the outside surface of said back panel serving as a stand.

8. The picture frame of claim 7, wherein the bracket serves as a connection to additional stand or securing device.

9. A picture frame, comprising:

a display screen for displaying digital images;

a backing layer placed along outside perimeter of said display screen;

a guiding layer substantially in the same shape as the backing layer;

a plurality of LED light modules placed on the backing layer and is substantially along the inner perimeter of the backing layer;

a main PCB unit;

a front frame; and a back panel, wherein said front frame and back panel will sandwich in said display screen, said backing layer, said guiding layer, said guard strip and said LED lights in place in a flatly stacked manner whereby the LED light modules generate lights that emit through the guiding layer towards the front frame direction and not towards sideways or backward direction.

10. The picture frame of claim 9, wherein said guiding layer is made from suitable transparent or translucent material to allow the light traveling and shining through.

11. The picture frame of claim 9, further having a guard film for attaching to said LED light modules for easy installing to a rear side of the guiding layer.

12. The picture frame of claim 9, further having a LED control unit connected to said main PCB unit to receive control signals transmitted to the picture frame.

13. The picture frame of claim 9, further having a speaker connected to said main PCB unit to generate desired sounds or music.

14. The picture frame of claim 9, further having a power unit that supplies electrical power to said display screen, main PCB unit, said LED lighting modules, said LED control module, and said speaker.

15. The picture frame of claim 9, further having a switch on the outside surface of said back panel, providing a manual on/off control of the picture frame's operation.

16. The picture frame of claim 9, wherein a bracket is additionally added to the outside surface of said back panel serving as a stand.

17. The picture frame of claim 16, whether the bracket serves as a connection to additional stand or securing device.

* * * * *